(12) United States Patent
Gittani et al.

(10) Patent No.: US 8,925,603 B2
(45) Date of Patent: Jan. 6, 2015

(54) TUBELESS-TYPE, SPOKED WHEEL FOR VEHICLES, IN PARTICULAR FOR MOTOR-CYCLES

(75) Inventors: Giuseppe Ulisse Gittani, Vanzago (IT); Gabriele Perris Magnetto, Rivoli (IT)

(73) Assignee: Gianetti Ruote S.p.A., Ceriano Laghetto (IT)

( * ) Notice: Subject to any disclaimer, the term of this patent is extended or adjusted under 35 U.S.C. 154(b) by 180 days.

(21) Appl. No.: 13/144,421

(22) PCT Filed: Jan. 12, 2010

(86) PCT No.: PCT/IB2010/050100
§ 371 (c)(1),
(2), (4) Date: Jul. 13, 2011

(87) PCT Pub. No.: WO2010/082155
PCT Pub. Date: Jul. 22, 2010

(65) Prior Publication Data
US 2011/0266863 A1    Nov. 3, 2011

(30) Foreign Application Priority Data
Jan. 14, 2009 (IT) .............................. TO2009A0020

(51) Int. Cl.
*B60B 21/12* (2006.01)
*B60B 21/06* (2006.01)
*B60B 1/04* (2006.01)

(52) U.S. Cl.
CPC .............. *B60B 21/068* (2013.01); *B60B 1/047* (2013.01); *B60B 21/12* (2013.01); *B60B 2900/5116* (2013.01); *B60Y 2200/13* (2013.01); *Y10S 152/09* (2013.01); *Y10S 152/16* (2013.01)

USPC ............ 152/381.5; 152/DIG. 9; 152/DIG. 16

(58) Field of Classification Search
USPC ......... 301/55, 58, 61, 67, 70, 104; 152/381.5, 152/381.6, DIG. 9, DIG. 16
See application file for complete search history.

(56) References Cited

U.S. PATENT DOCUMENTS

| 1,209,006 | A | * | 12/1916 | Leo | 294/86.2 |
| 3,008,770 | A | * | 11/1961 | Mueller | 301/95.106 |
| 4,108,232 | A | * | 8/1978 | Simpson | 152/513 |
| 4,824,177 | A | * | 4/1989 | Aloy | 301/58 |

(Continued)

FOREIGN PATENT DOCUMENTS

| DE | 203 16 995 U1 | 12/2003 |
| DE | 10 2004 055 892 A1 | 5/2006 |

(Continued)

*Primary Examiner* — Kip T Kotter
*Assistant Examiner* — Jean Charleston
(74) *Attorney, Agent, or Firm* — Sughrue Mion, PLLC

(57) ABSTRACT

The wheel (1) comprises a rim (2) and a hub (3) between which a plurality of spokes (4) are connected. The rim has a radially recessed, cylindrical outer surface (2a-2d) with a channel-shaped cross-section and is provided with a plurality of drilled seats (6) each intended for the attachment of a respective nipple (5) for the connection of a spoke (4). Annular sealing members (13) are provided between each nipple (5) and the corresponding drilled seat (6) of the rim (2).
The wheel (1) further comprises a circumferential, band-like seal (14) which is made of resilient material, is fitted on the rim (2), and extends over the recessed cylindrical surface of the rim (2) in a circumferentially stretched condition so as to sealingly cover all of the drilled seats (6).

7 Claims, 5 Drawing Sheets

(56) References Cited

U.S. PATENT DOCUMENTS

| | | | |
|---|---|---|---|
| 6,019,149 A * | 2/2000 | Stringer | 152/381.5 |
| 6,237,662 B1 * | 5/2001 | Thomasberg | 152/510 |
| 7,445,034 B1 * | 11/2008 | Huang | 152/381.5 |
| 7,487,811 B2 * | 2/2009 | Schelhaas | 152/381.5 |
| 2004/0095014 A1 | 5/2004 | Veux et al. | |
| 2005/0189813 A1 * | 9/2005 | Bauer | 301/95.104 |
| 2005/0210675 A1 * | 9/2005 | Price et al. | 29/894.31 |
| 2006/0010841 A1 | 1/2006 | Trezza, II et al. | |
| 2007/0029869 A1 | 2/2007 | Senoo | |

FOREIGN PATENT DOCUMENTS

| | | |
|---|---|---|
| DE | 10 2006 029 468 A1 | 2/2007 |
| EP | 1 209 003 A1 | 5/2002 |
| EP | 1 209 006 A1 | 5/2002 |
| JP | 63-025101 A | 2/1988 |
| JP | 2000-127701 A | 5/2000 |
| WO | 2006/038239 A1 | 4/2006 |
| WO | 2007/034426 A2 | 3/2007 |

\* cited by examiner

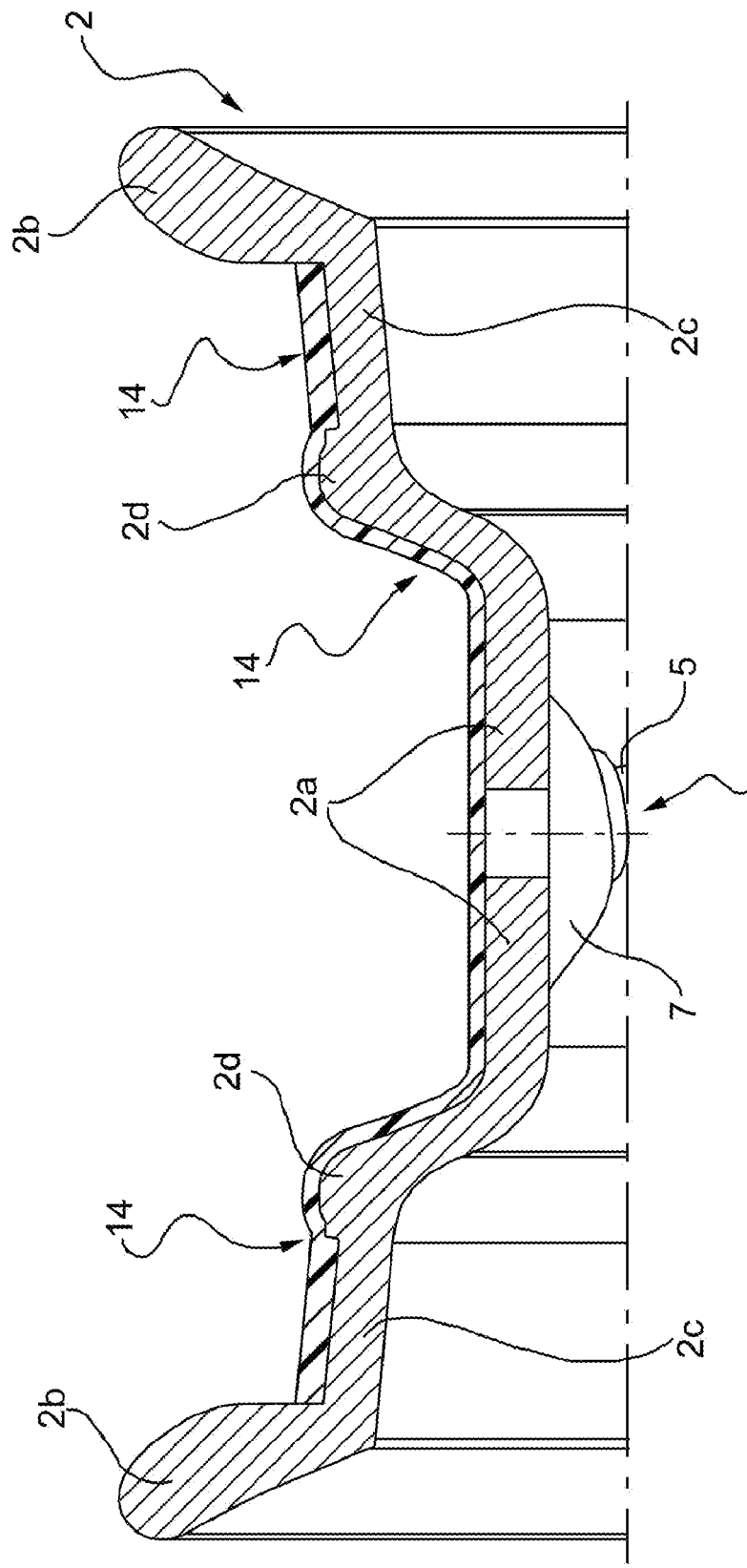

TUBELESS-TYPE, SPOKED WHEEL FOR VEHICLES, IN PARTICULAR FOR MOTOR-CYCLES

CROSS REFERENCE TO RELATED APPLICATIONS

This application is a National Stage of International Application No. PCT/IB2010/050100 filed Jan. 12, 2010, claiming priority based on Italian Patent Application No. TO2009A000020, filed Jan. 14, 2009, the contents of all of which are incorporated herein by reference in their entirety.

The present invention relates to a spoked wheel for vehicles, in particular for motor-cycles.

More specifically, the invention relates to a tubeless-type, spoked wheel, that is, a wheel that is intended for the fitting of a tubeless tyre, the wheel comprising a rim and a hub between which a plurality of spokes are connected, wherein the rim has a radially recessed, cylindrical outer surface with a channel-shaped cross-section and is provided with a plurality of drilled seats each intended for the attachment of a respective nipple for the connection of a spoke, and wherein annular sealing means are provided between each nipple and the corresponding drilled seat of the rim.

A tubeless-type, spoked wheel is described and illustrated, for example, in European patent application EP-1 209 003-A.

A further tubeless-type, spoked wheel is described in the Applicant's International patent application WO 2007/034426. In the wheel described and illustrated in this latter document, the rim comprises a first, inner rim portion and a second, outer rim portion which are separate from one another; the radially outer rim portion forms the base wall of the rim, and the second, radially inner rim portion has the drilled seats for the spoke connection nipples. The rim portions are joined together, preferably releasably, for example, by means of threaded connection members. A respective annular sealing element in the form of an O-ring is provided between each nipple and the corresponding drilled seat of the rim. Moreover, further sealing O-rings extend circumferentially between the first and second rim portions.

An objective of the present invention is to provide a tubeless-type, spoked wheel which has a simplified structure, is highly reliable in operation, and enables any repair operations to be performed easily.

This and other objectives are achieved, according to the invention, by a wheel of the type specified above, characterized in that it further comprises a circumferential, band-like seal which is made of resilient material, is fitted onto the rim, and extends over the recessed, cylindrical surface of the rim in a circumferentially stretched condition so as sealingly to cover all of the above-mentioned drilled seats.

According to a further characteristic, each of the annular sealing means that are provided between each nipple and the corresponding drilled seat of the rim preferably comprises a sleeve which is made of elastomer material and is fitted on the portion of the nipple that extends through the hole of the corresponding seat of the rim, and which has an axial length equal to or greater than the length of the said hole.

The sealing sleeves are preferably fitted onto the corresponding nipples after the sleeves have been heated so that, in the assembled condition, the sealing sleeves extend around the nipples in a circumferentially stretched condition.

Further characteristics and advantages of the invention will become clear from the following detailed description which is given purely by way of non-limiting example with reference to the appended drawings, in which:

FIG. 3 is a view sectioned on the line III-III of FIG. 2,

Figure 1:
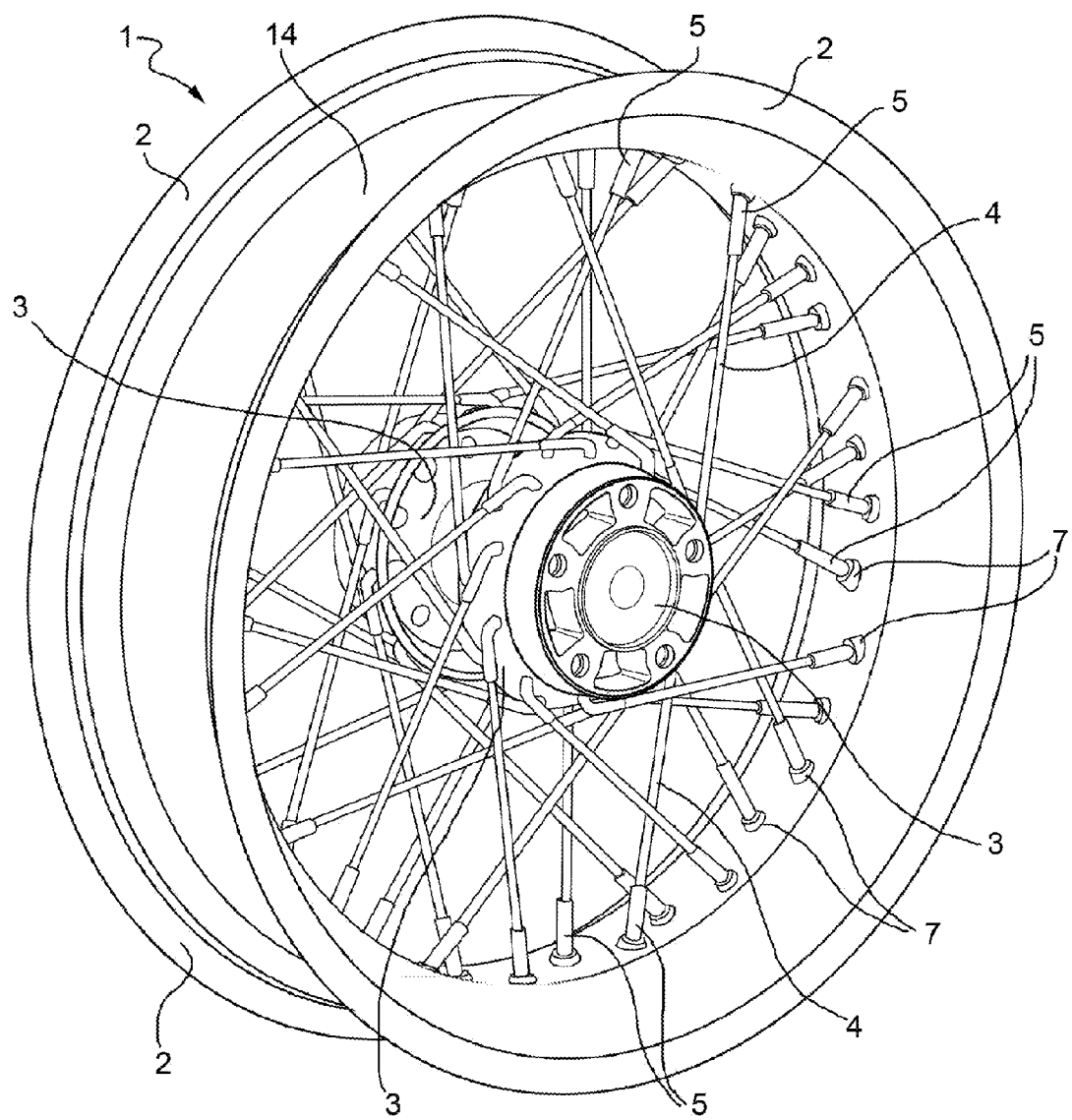
FIG. 1 is a perspective view of a wheel according to the present invention.

A tubeless-type, spoked wheel for vehicles, in particular for motor-cycles, is generally indicated 1 in FIG. 1.

The wheel 1 comprises a rim 2 and a hub 3 between which a plurality of spokes 4 are connected.

The spokes 4 are connected at their inner ends to a pair of flanges of the hub 3 and at their outer ends are connected to the rim 2 by means of nipples 5.

Figure 4:
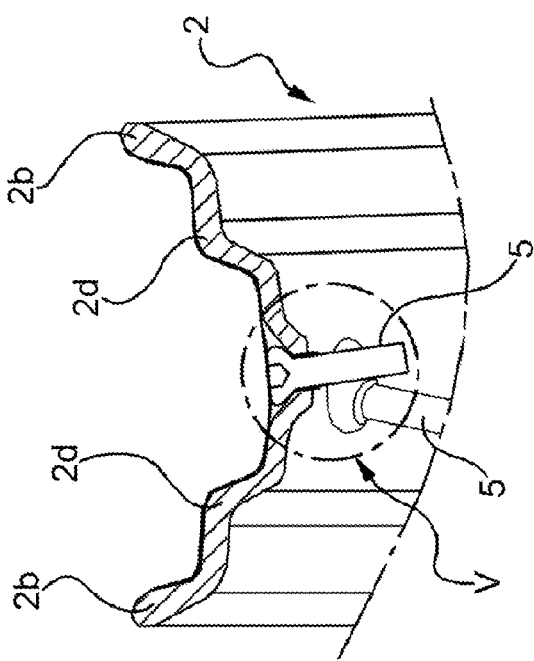
FIG. 4 is a view sectioned on the line IV-IV of FIG. 2.

The rim 2 has, in known manner, a radially recessed, cylindrical outer surface of substantially channel-shaped cross-section with a base wall 2a and a pair of sides or side walls 2b (see FIGS. 3 and 4 in particular).

In any case, the surfaces and the outside dimensions of the rim 2 are suitable for housing a tubeless tyre in accordance with the international standards that are in force, whereas the inside dimensions may vary according to aesthetic/stylistic considerations and/or other requirements.

In the embodiment shown by way of example, between the sides or side walls 2b and the base wall 2a, the rim 2 forms two annular shoulder walls 2c which, on one side, directly adjoin the adjacent sides 2b and, on the other side, adjoin the base wall 2a via respective humps 2d (FIG. 3).

For improved coupling with the tubeless tyre, the sides 2b of the rim 2 are preferably formed with an increased thickness.

Figure 2:
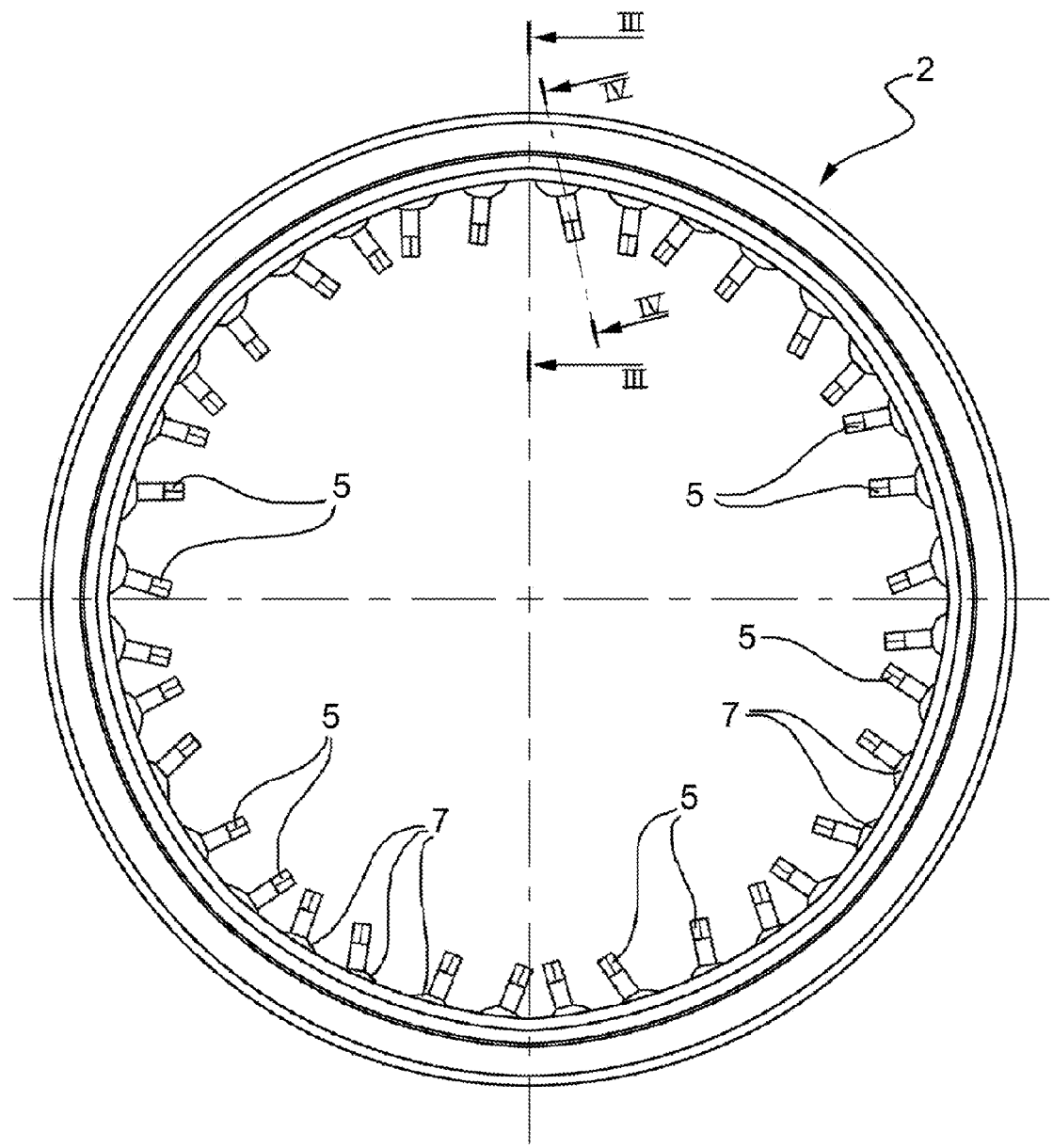
FIG. 2 is a side elevational view of the rim of the wheel of FIG. 1.
Figure 5:
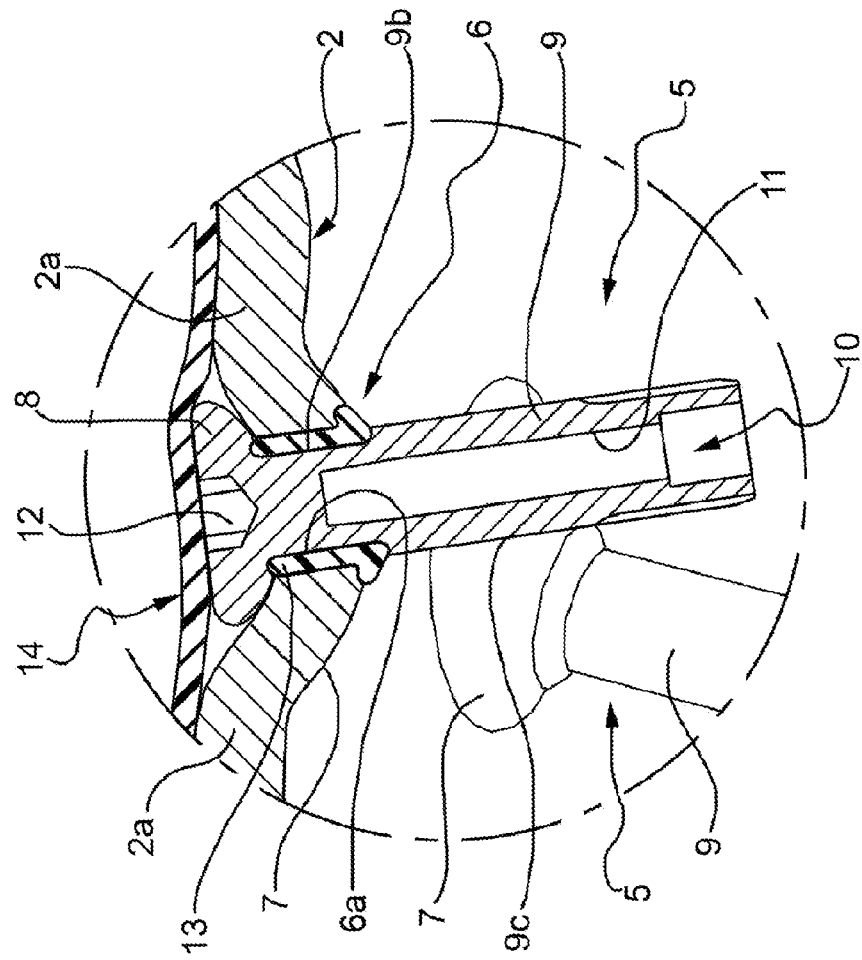
FIG. 5 shows a detail indicated V in FIG. 4, on an enlarged scale.

With reference to FIGS. 2 and 5 in particular, a plurality of drilled seats 6 are provided in the base wall 2a of the rim 2 for the attachment of respective nipples 5. Each drilled seat 6 is formed in a respective boss or flared seat 7 of the rim 2, which boss or flared seat 7 protrudes towards the hub 3.

In general, the seats for the nipples may also be provided in parts of the rim 2 other than the base wall 2a. Moreover, the seats may be formed in portions of the rim which do not have bosses but nevertheless have a suitable thickness.

Each seat 6 comprises a substantially cylindrical through-hole 6a which extends through the base wall 2a of the rim 2 in the region of a respective boss 7 (FIG. 5).

Figure 7:
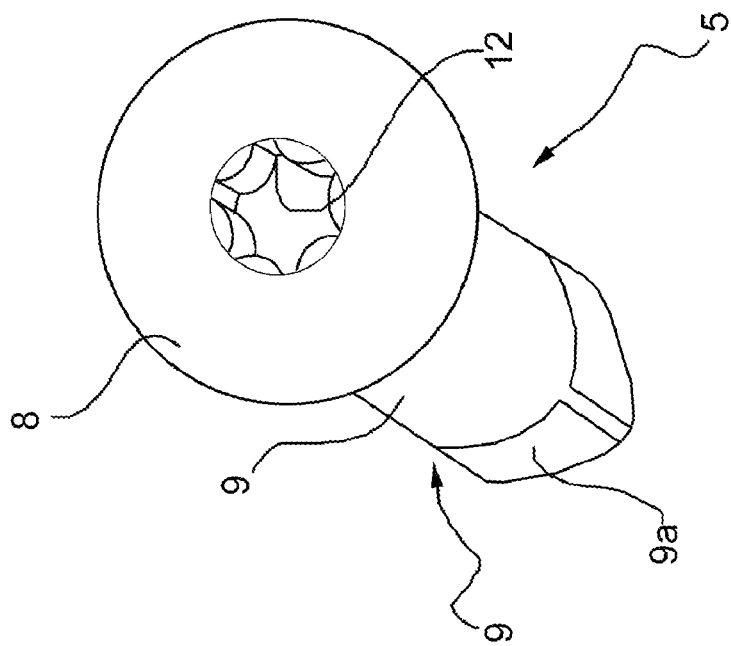
FIGS. 6 and 7 are two different perspective views of a nipple for a wheel according to the invention.
Figure 6:
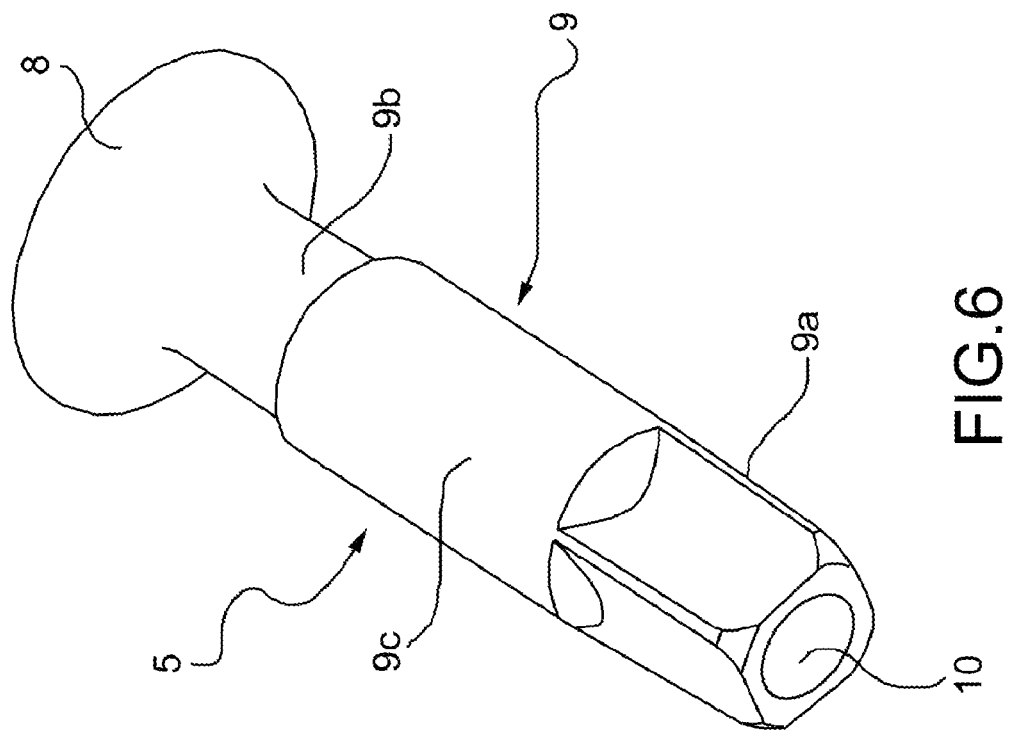

With reference to FIGS. 6 and 7, each nipple 5 comprises a head 8 which is integral with a substantially tubular stem 9.

With reference to FIGS. 5 and 6, an axial blind hole 10 is formed in the stem 9 of each nipple 5, starting from the distal end, and is provided, in known manner, with a thread 11 for connection to the corresponding spoke.

The head 8 of each nipple 5 has a rounded profile in section and is advantageously shaped and processed so as to be free of burrs and/or sharp edges.

As can be seen in FIGS. 5 and 7, a recess or seat 12 is advantageously formed in the head 8 for the engagement of a manual or automatic screwing device, and/or of a device for checking the tightening torque. In the embodiment illustrated, the seat 12 is of the so-called "Torx" (registered trade mark) type.

The distal end 9a of the shaft or stem 9 of each nipple is advantageously shaped, for example, by means of substantially polygonal faceting, to facilitate gripping.

With reference to FIGS. 5 and 6, the proximal end 9b of each shaft or stem of the nipples 5 advantageously has a smaller diameter than the adjacent intermediate portion 9c thereof.

An annular sealing member, indicated 13 in FIG. 5, is operatively interposed between the proximal portion 9b of the stem of each nipple 5 and the wall of the corresponding through-hole 6a of the seat 6 of the rim 2.

The annular sealing member 13 is advantageously formed as a sleeve which is made of elastomer material and, after being heated, is fitted onto the portion 9b of the nipple stem. The sealing sleeve 13 preferably has an axial length which is equal to or greater than the length of the through-hole 6a of the corresponding seat 6.

The sealing sleeve 13 is pre-fitted on the nipple and the nipple is then interference fitted in the through-hole 6a of the corresponding seat 6 of the rim.

The head 8 of each nipple is then housed mainly in the recess of the boss 7 in which the corresponding seat 6 of the rim 2 is formed (see FIG. 5).

With reference to FIGS. 1 and 3 to 5, according to the invention, a circumferential band-like seal 14, for example made of elastomer material, is fitted around the rim 2. The seal 14 is fitted onto the rim 2 after the mounting of the nipples 5 and it is preferably stretched circumferentially in the fitted condition. The seal advantageously covers at least the outer surface of the base wall 2a of the rim 2 and, preferably, the entire outer surface of the rim except for the sides or side walls 2b which are intended to cooperate with the tubeless tyre (see FIG. 3 in particular). The seal 14 includes lateral end portions with an essentially rectangular cross-section having an increased thickness, which are engaged in corresponding recesses of the recessed, cylindrical outer surface of the rim.

The band-like seal 14 helps to prevent leakages between the region that is operatively inside the tyre and the surrounding atmosphere.

However, the seal performs another important function: in the event of the breakage of a spoke, the seal 14 prevents the corresponding nipple 5 from coming out of its seat in the rim, thus avoiding the danger that the nipple might damage the tyre, so that the wheel nevertheless remains fully functional.

The seal 14 is "custom made" for the specific rim on which it is to be fitted.

The fitting of the seal 14 on the rim 2 does not require the use of conventional fixing means such as screws, glues, sealants, etc. The seal can also be removed easily, for example, for the replacement of one or more damaged nipples or for repair or touching-up operations of other types (such as repainting or re-chroming operations, etc.). When these operations have been completed, the seal can easily be refitted in accordance with the initial fitting method.

In the event of tearing or damage, the seal 14 can easily be removed and replaced.

The nipples 5 are advantageously made, for example, of "high speed" lead steel which material has good toughness and optimal workability with machine tools.

A surface galvanizing treatment may advantageously be provided for to protect the nipples from corrosion.

Naturally, the principle of the invention remaining the same, the forms of embodiment and details of construction may be varied widely with respect to those described and illustrated purely by way of non-limiting example, without thereby departing from the scope of the invention as defined in the appended claims.

The invention claimed is:

1. A tubeless-type, spoked wheel for vehicles, comprising:
a rim and a hub between which a plurality of spokes are connected, wherein the rim has a radially recessed, cylindrical outer surface with a channel-shaped cross-section having a base wall and a pair of side walls,
wherein, between the side walls and the base wall, the rim forming annular shoulder walls which adjoin the base wall via respective humps,
wherein the base wall is provided with a plurality of drilled seats each configured for the attachment of a respective nipple for the connection of a spoke,
wherein annular sealing means are provided between each nipple and the corresponding drilled seat of the rim,
wherein the wheel further comprises a circumferential, band-like seal which is made of resilient material, fitted on the rim, and extending on the entire recessed, cylindrical outer surface of the rim except for the pair of side walls of the recessed, cylindrical outer surface, in a circumferentially stretched condition so as to engage the nipples and sealingly cover the drilled seats, and
wherein said band-like seal including lateral end portions with an essentially rectangular cross-section having an increased thickness, which are engaged in corresponding recesses of the recessed, cylindrical outer surface of the rim.

2. A tubeless-type spoked wheel according to claim 1 wherein each annular sealing means comprises a sleeve which is made of elastomer material and is fitted onto the portion of the nipple that extends through the hole of the corresponding seat of the rim, and which has a length equal to or greater than the length of the said hole.

3. A tubeless-type, spoked wheel according to claim 1 wherein each of the said drilled seats is formed in a respective boss or flared seat of the rim, which boss or flared seat protrudes towards the hub.

4. A tubeless-type, spoked wheel according to claim 2 wherein the nipple and the associated sealing sleeve are interference fitted in the hole of the associated seat of the rim.

5. A tubeless-type, spoked wheel according to claim 3 wherein each nipple has an enlarged end or head which is housed mainly in the boss or flared seat of the corresponding seat of the rim.

6. A tubeless-type, spoked wheel according to claim 5 wherein the enlarged end or head of each nipple has a shape which is at least partially complementary to that of the corresponding boss or flared seat of the rim.

7. A tubeless-type, spoked wheel according to claim 5 wherein the enlarged end or head of each nipple has a rounded profile in cross-section.

* * * * *